Sept. 22, 1925.
C. BERG
1,554,549
TRUCK MOUNT
Filed Dec. 5, 1921
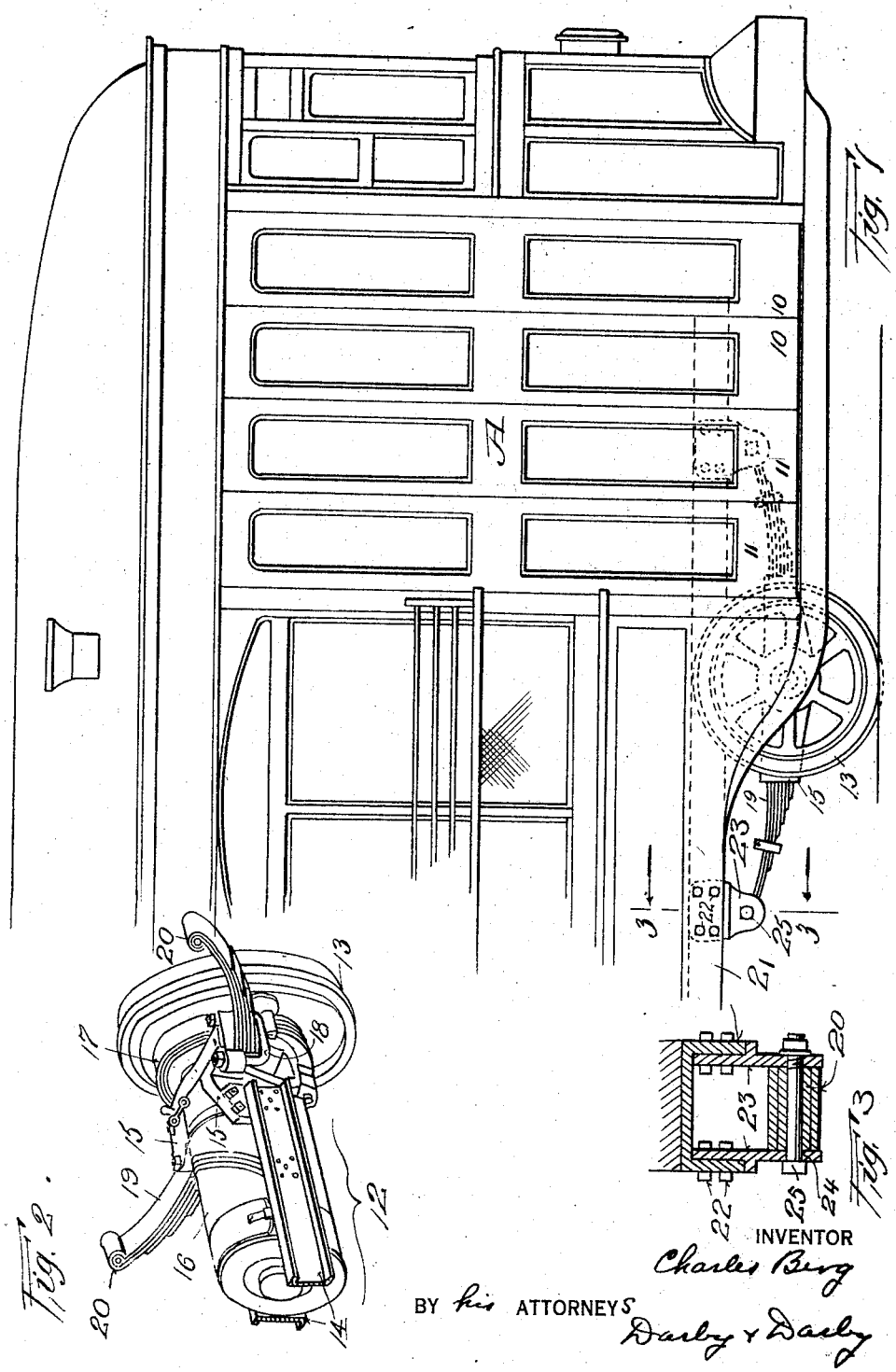
INVENTOR
Charles Berg
BY his ATTORNEYS
Darby & Darby Patented Sept. 22, 1925.

1,554,549

UNITED STATES PATENT OFFICE.

CHARLES BERG, OF NEW YORK, N. Y.

TRUCK MOUNT.

Application filed December 5, 1921. Serial No. 519,819.

*To all whom it may concern:*

Be it known that I, CHARLES BERG, a citizen of the United States, residing at New York, in the county and State of New York, have made a certain new and useful Invention in Truck Mounts, of which the following is a specification.

This invention relates to motor trucks and manner of mounting the car body thereon. More particularly, the invention relates to that type of trucks which carry the drive motors and thus form a complete power unit, as, for example, where the motor is electrically operated, and is mounted directly on the wheel or axle.

The object of my invention, therefore, includes the provision of a construction, and simple and effective means, whereby the power unit may be quickly removed from the car body, and a new, or repaired, power unit substituted therefor.

A further object includes the construction of a complete power unit provided with means for readily attaching, or detaching, said unit.

A still further object includes the provision of means on the car body whereby the power unit may be safely held in place, and also quickly detached in case of needed repair.

Other objects will appear hereinafter, and I attain these objects by the mechanism illustrated in the accompanying drawing, in which—

Fig. 1 is a view in side elevation of a portion of a car body provided with my invention;

Fig. 2 is a view in perspective of one-half of a complete power unit;

Fig. 3 is a view on the lines 3—3 of Fig. 1, viewed in the direction of the arrows.

Similar numerals refer to like parts in the several views, and while I have shown a specific embodiment of my invention, it is understood that the same is given by way of example, as the underlying principle thereof is applicable to other types of cars or vehicles from that shown. The invention is especially well adapted for use in the so-called trackless trolley cars, and in motor trucks, as well as on the type of car shown in Fig. 1.

Referring now to the drawing, A represents the front end of a trolley car, which is provided with my invention. This car has the usual entrance and exit doors 10 and 11, and is removably mounted on the power unit 12, in the manner explained below.

The power unit may consist of a pair of wheels 13 (only one being shown here for simplicity), mounted on an axle bar 14, in a housing 15, and carrying an electrically operated motor 16 (one for each wheel). The usual and necessary brake 17, is also provided. On the housing 15, by any suitable means, as a clevis 18, there are firmly secured the elliptical bearing or supporting springs 19. These springs may curve upwards, as shown, and terminate in bolt-eyes 20, for the purpose hereinafter stated.

To the supporting frame, or chassis, 21, of the car or truck, there are firmly secured, by any suitable means, as bolts 22, the tie or anchor plates 23. These plates are provided with bolt eyes 24, in the depending flanges, for receiving the anchor bolts or lock keys 25, to thereby secure the supporting springs in place. By this construction it is apparent that either the front or the rear power unit may be readily removed by simply disconnecting the four tie bolts, the power cable and brake connections.

From the above description it is apparent that damaged power units may be readily replaced by new or repaired units, and that repairs of motors or trucks may be made at the shops at any time as may be found advantageous. It is further apparent that by employing my invention, there is no unnecessary delay or tie up of cars, and that it is not necessary to invest capital in car bodies which are standing idle and kept in reserve for emergencies when power units become inoperative, or are in need of repair.

Having now described an embodiment of my invention, what I claim as new and useful and of my own invention, and desire to secure by Letters Patent is:

The combination in a motor car of a detachable power unit and a car body having attached thereto anchor plates with lock keys, a housing for said power unit having attached thereto axle bars and carrying an electric motor and a car wheel at either end of said axle bars, and springs attached to said housing to extend therefrom in opposite directions, said springs having anchor eyes in the extended end thereof for engaging the lock keys on the anchor plates.

In testimony whereof I have hereunto set my hand on this 1st day of December A. D. 1921.

CHARLES BERG.